(12) United States Patent
Wuest et al.

(10) Patent No.: US 12,242,597 B2
(45) Date of Patent: Mar. 4, 2025

(54) AUTOMATIC GENERATION OF PRODUCTION SECURITY CONTROLS FROM A TESTING COLLABORATION PLATFORM

(71) Applicant: Acronis International GmbH, Schaffhausen (CH)

(72) Inventors: Candid Wuest, Bassersdorf (CH); Igor Milosevic, Smederevo (RS); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 163 days.

(21) Appl. No.: 18/145,785

(22) Filed: Dec. 22, 2022

(65) Prior Publication Data

US 2024/0211590 A1    Jun. 27, 2024

(51) Int. Cl.
*H04L 29/06* (2006.01)
*G06F 21/54* (2013.01)

(52) U.S. Cl.
CPC ........ *G06F 21/54* (2013.01); *G06F 2221/033* (2013.01)

(58) Field of Classification Search
CPC .............................. G06F 21/54; G06F 2221/033
See application file for complete search history.

(56) References Cited

U.S. PATENT DOCUMENTS

| | | | |
|---|---|---|---|
| 10,616,280 B2 | 4/2020 | Purushothaman | |
| 10,867,044 B2 * | 12/2020 | Soby | G06F 21/57 |
| 11,049,058 B2 * | 6/2021 | Aasoori | G06Q 10/06375 |
| 11,314,630 B1 | 4/2022 | Perumal et al. | |
| 2022/0329630 A1 * | 10/2022 | Li | G06F 21/577 |
| 2023/0229781 A1 * | 7/2023 | Stolbikov | G06N 20/00 726/23 |

* cited by examiner

*Primary Examiner* — Jason K Gee
(74) *Attorney, Agent, or Firm* — ESPE Legal Consultancy FZ-LLC

(57) ABSTRACT

The present disclosure relates to a system and method of automatically updating the set of security controls in the production environment using AI based on historical data generated in the test management system TMS during the system's testing in the testing environment including information about its elements, their properties, testing environment, its characteristics, and security controls with their settings. Once the AI has sufficient historical data from a testing environment, every time a change is detected to the system in the production environment, its elements, their properties, or at least one characteristic of the production environment, the AI system makes a recommendation to update the set of security controls in the production environment.

10 Claims, 2 Drawing Sheets

AUTOMATIC GENERATION OF PRODUCTION SECURITY CONTROLS FROM A TESTING COLLABORATION PLATFORM

FIELD OF THE INVENTION

The present disclosure generally relates to the cybersecurity of information systems. Specifically, this disclosure is related to security testing of information systems and the use of artificial intelligence to configure security controls of production systems based on results obtained during security testing.

BACKGROUND OF THE INVENTION

Many information systems go through a rigorous testing process that often covers different configurations including ones that are different from the actual production configuration. Testing of complex information systems is usually performed with the use of testing management systems (TMS) that record information about the system under test (SUT), its elements, their configurations, the testing environment, its parameters, as well as elements of a test plan and developed security controls to mitigate discovered and identified vulnerabilities.

TMS are deployed in testing environments. When a change is made to the production system that may have been covered in whole or in part by one of the testing configurations, and security controls have been developed for at least some of the elements of that new production configuration, the information learned in the course of testing must be reviewed and copied. New security controls are then developed for the production environment.

A system and method are needed that automatically deploy security controls to a production environment when the production environment changes.

SUMMARY OF THE INVENTION

A method and system take as input historical data about configurations of an element of a system under test (SUT) marked safe in the test management system (TMS), as well as security controls corresponding to these configurations developed during testing, and, based on that testing data, when a new configuration of the element of SUT appears in production environment, artificial intelligence (AI), trained on data from the testing environment, automatically generates and applies a new set of security controls in the production environment.

The present system comprises a test management system (TMS) that contains historical data of configurations of the elements of the SUT marked safe, corresponding parameters of security controls, an AI training module that calculates embeddings of configurations of the element of SUT of length M (M-embeddings) and embeddings of the parameters of security controls of length N (N-embeddings). These embeddings are used to train a neural network (NN) configured to take as input an M-embedding and output an N-embedding. An AI recommendation module receives information about a new configuration of the element of SUT in production environment, calculates its M-embedding, inputs that M-embedding into the neural network NN, receives an N-embedding as an output, uses that N-embedding to calculate the new set of parameters of security controls, and passes them to the security application module. A security application module receives the set of new parameters of security controls from the AI recommendation module and applies them to the elements of the SUT in the production environment.

Each element of the SUT has a finite set of settings, and each setting has a limited range, allowing for creation of a numeric representation of these settings of a fixed size N, an N-embedding.

The same is true for the parameters of security controls. There is a finite number of parameters for a set of security controls, and each parameter has a limited range that allows for creation of a numeric representation of these settings of a fixed size M, an M-embedding.

In an embodiment, members of Red (attacking) and Blue (defending) teams operate with SUT with its elements, their properties, environment, its characteristics, test steps (manual, automated, and mixed), their settings, test results, workflow, test execution automation, report generation, and development of security controls, generating historical data.

In an embodiment, security controls developed by the Blue Team contain generation of reports as investigative controls, changing settings of the environment, for example, external gateways, proxy servers, deployment of additional system or environment elements such as gateways, deployment of intrusion detection systems (IDS), changing system parameters, for example, increasing delays between allowed login attempts, or adding rules to block certain IP addresses or IP address ranges if a certain event occurs.

Once the system collects sufficient information for analysis, N-embeddings of the settings of the element of SUT that have been marked safe and corresponding M-embeddings of parameters of security controls are used to train the neural network NN.

When a new configuration of the element of SUT in a production environment is communicated to the system of current disclosure, the system calculates the M-embedding of that configuration, inputs it into the trained neural network NN, obtains the N-embedding as the output of the neural network NN, generates new parameters of security controls corresponding to the newly generated N-embedding, and applies these new parameters of security controls to the element of SUT in the production environment.

DETAILED DESCRIPTION

Figure 1:
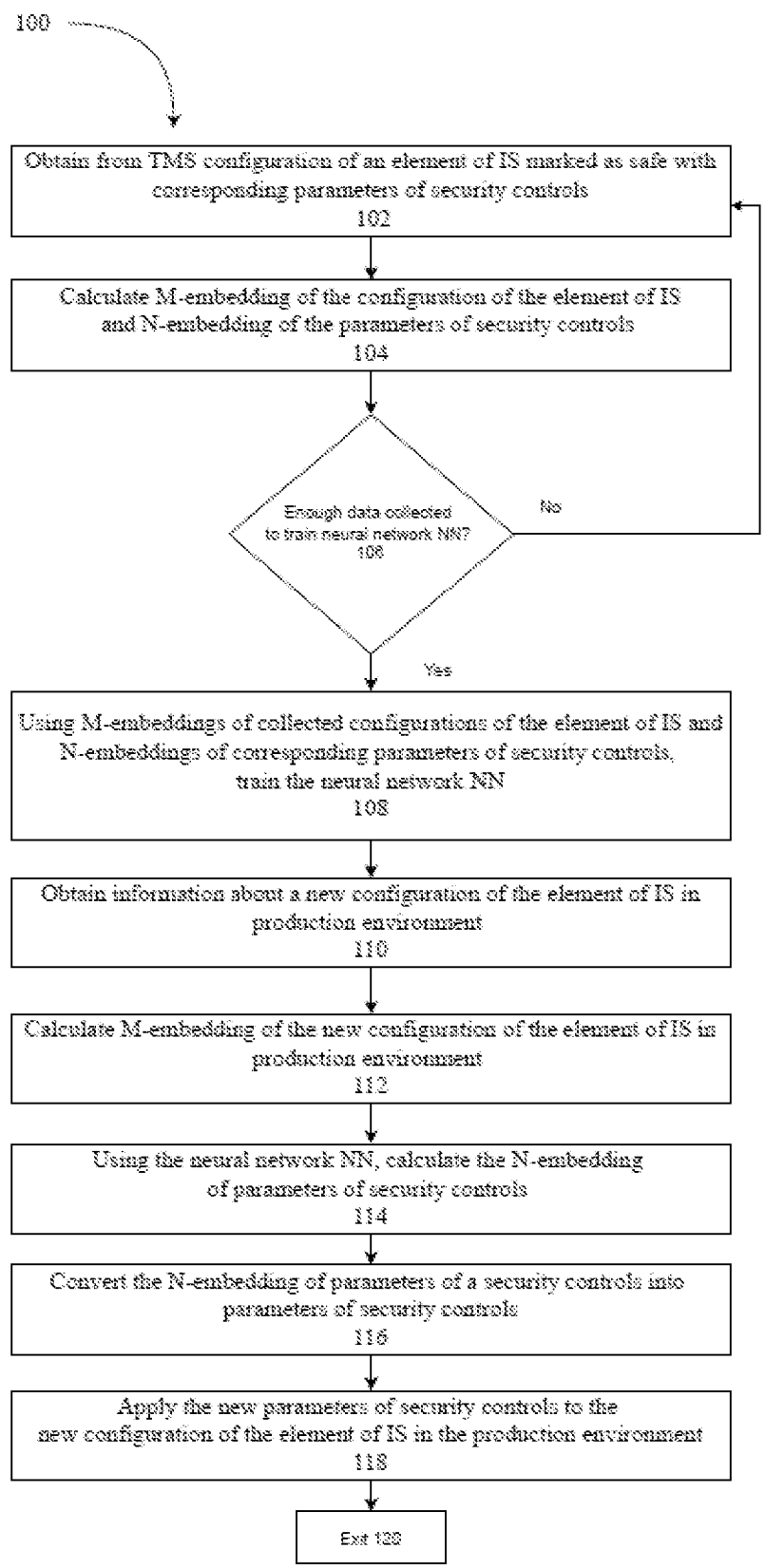
FIG. 1 is a block diagram of an embodiment of the method of automatic application of the set of security controls with additional checking for sufficiency of training data.

Penetration testing ensures safety and security of a computer system. Penetration testing includes security testing, which develops controls to mitigate discovered and identified risks.

Testing brings the tested system to a safe state where all identified risks posed by threat agents and threat events have been mitigated to an acceptable level, usually by making changes to the system or by applying security controls.

In each security state, a set of security controls is identified that are related to different elements of the information system (IS) under test.

There are many types of testing. Examples include unit testing, integration testing, protocol testing, HTML, script, or SQL injection testing, cross-site scripting testing, testing against parameter change attacks, load testing, pick testing, escalation of privilege testing, testing against replay attack, testing against man-in-the middle attacks, testing against social engineering attacks, and IP address and port scanning. Each type of test may have many embodiments with different parameters.

Some of these tests are only relevant for certain elements of the system or their combinations, as well as for certain environments.

For example, network scanning, data and protocol analysis, modification of network traffic, and running scripts and programs that are specifically developed to exploit known vulnerabilities, such as SQL injection and HTML injection.

The two groups of people involved in penetration testing are often designated as the Red and Blue teams. The Red Team is made up of penetration testers who try to attack the system. The Blue Team takes measures to develop security controls to mitigate the vulnerabilities identified by the Red team.

During security testing, different configurations of the system under test (SUT) and the environment are tested. Ideally, testing covers a large portion of combinations of system and environment settings. When a system goes into production, and the system itself or its environment is later re-configured, that new configuration of the product and the environment or at least some of its elements may have already been tested by the Red team and controls been developed by the Blue team to address vulnerabilities discovered by the Red team for that configuration.

During the testing process, the Red team attempts to compromise the security of individual configuration while the Blue team is taking actions to defend the system from attacks.

Testing of a system consists of execution of a multitude of test steps of different complexity and scope with individual settings that include relationships between such steps. A collection of all security test steps, and their settings used to perform security testing of a system is referred to as a security test scenario.

The system to be tested typically comprises multiple elements. For example, the system may comprise software programs, hardware units, and communication channels between them.

The rest of the digital universe outside of the system is that system's environment. The boundary is defined in each case and typically includes the operating system on which different elements of the system are running, as well as external elements. Typical external elements are software or hardware units, communicating directly with the system. The scope of the definition of the environment may be smaller or larger in a particular case.

A change in the configuration of the environment affects the security of the system. For example, if a software element of the system is moved from a dedicated hardware server to a shared hardware server or to a virtual server, the security environment of the system that has an element running on that hardware server changes.

In general, two major classes of elements are available to the Blue team that contribute to the security of a system. These are the system itself as a collection of elements and their settings, and the environment in which the system works with its characteristics.

In some cases, the attack developed by the Red team will require a rewrite of the code of the SUT. In other cases, the system itself or the environment in which the system operates may be configured to mitigate the discovered threat, or other security controls may be applied. For example, the hosting server may be moved from a public domain to a demilitarized zone, new rules may be deployed to a gateway server, or timeouts may be increased for failed login attempts.

A change in settings of any system or environment element, as well as addition or removal of an element may affect the overall security of the system. For example, a version of a third-party library used by the system was updated, a protocol used to communicate between different parts of the system has changed, or an internally developed element was updated.

A limited number of security testing scenarios and security controls, developed during testing recorded in the test management system TMS and based on that knowledge, are used to automatically generate security controls in the production environment if a change in the system, its elements or settings, or the configuration of the environment are detected similar to a configuration that has already been tested for which security controls have been developed.

The testing system collects data about the system under test (SUT) and the testing process.

Historical data about the SUT is collected, including its elements, their properties, testing environment, its characteristics, as well as tests, and their settings that are used during testing. Also collected are security controls deployed by the Blue Team to mitigate security vulnerabilities identified by the Red Team.

Once a sufficient amount of historical data is collected in the testing environment to configure the AI system, each time the element of IS obtains a new configuration in the production environment, the AI part of the system automatically generates new parameters of security controls and applies them to the element of IS in the production environment by changing the parameters of the security controls of the element of IS to the new values calculated by the AI.

During penetration testing, all aspects of security are potentially at issue. These include, for example, confidentiality, integrity, and availability of an information system. Other targets of testing include possible denial-of-service attacks that may lead to the system becoming not available.

There are multiple approaches to testing, including scanning for open ports, versions of COTS software with known vulnerabilities, source code analysis, protocol analysis, use of scripts developed by third parties, and development of tests as a part of the Waterfall and Agile software development approaches.

Blue team develops security controls not only against potential actions threat agents, but also against threat events that may compromise confidentiality, integrity, or availability of the system, for example, a failure of a hard drive where information is hosted, loss of power at a facility where servers are hosted, unintended consequences of vulnerability scanning of a system, or loss of connectivity to the Internet at one of the system nodes.

In general, the two major classes of elements contributing to the security of a system are the system itself as a collection of elements, including their settings, and the environment in which the system works with its characteristics. The system may be composed of multiple elements, such as software programs, hardware units, and communication channels between them. There are numerous different types of testing including unit testing, integration testing, protocol testing, HTML, script, or SQL injection testing, cross-site scripting testing, testing against parameter change attacks, load testing, pick testing, escalation of privilege testing, testing against replay attack, testing against man-in-the middle attacks, testing against social engineering attacks, IP address and port scanning, etc.

Some of these tests are only relevant for certain elements of the system or their combinations, as well as to certain environments.

A change in settings of any such element, as well as addition or removal of an element may affect the overall security of the system. For example, a version of a third-party library used by the system may change, a protocol used to communicate between different parts of the system may change, or an internally developed element may be updated.

The environment is the rest of the digital universe outside of the system. It is often hard to determine the boundaries of the environment that affects the security of a given system, but for the practical intents and purposes such boundary is normally well-determined in each case and includes the operating system on which different elements of the system are running and external elements, including software or hardware units, communicating directly with the system. The scope of the definition of the environment may be smaller or larger in a particular case.

A change in the configuration of the environment may affect the security of the system. For example, if a software element of the system is moved from a dedicated hardware server to a shared hardware server or to a virtual server.

Testing of a system consists of execution of a multitude of test steps of different complexity and scope with individual settings that include relationships between such steps.

During its routine functionality, SUT operates with the members of the Red and Blue teams, system elements, their properties, environment, its characteristics, test steps (manual, automated, and mixed), their settings, test results, workflow, test execution automation, and report generation, generating historical data.

Security testing comprises several major phases: information gathering, analysis and planning, vulnerability scanning, exploitation, risk analysis and remediation suggestion, and reporting. During each phase the Blue team works on development of security controls to mitigate identified threats posed by threat agents and threat events.

Parameters of security controls often require manual configuration, for example, performing vulnerability scanning of a newly introduced physical server. In that case, vulnerability scanning is an example of a security control applied to a server added to the system. One that control is identified by the Blue team in testing, if a server is added to the production environment, a similar security control is applied to it as well, that is a vulnerability scan is run against the newly installed server.

In one example, the element of IS is a physical server. In that example, the configuration of the element comprises an array with one Boolean value for each one of the 65,536 ports on which a software installed on that physical server is listening.

In that example, the security controls for that element are a vulnerability scanning with parameters comprising an array with one Boolean value for each one of the 65,536 ports on which the scanner will expect a listening software to respond.

If the vulnerability scanner encounters a response on a port that is not in the list of open ports, it will fail. If it does not, it will pass.

During testing, only configurations of the server are tested when one port is open.

For each one of these configurations, the corresponding port is marked in the test scenario as open (corresponding value is set to True represented by "1" while others are set to False represented by "0").

After the application of these test controls, the configuration with one open port is marked as Safe in the test management system TMS, and that configuration is recorded along with the corresponding settings of the security test scenario.

Once each port has been tested successfully, the test management system TMS contains information about 65,536 configurations of the element of IS marked Safe and their corresponding parameters of security controls.

In this example, the M-embedding of configuration of the element of IS is 65,536 bit long and the N-embedding of parameters of test controls is also 65,536 bit long.

The collection of 65,536 configurations of the element of IS in this example form a diagonal matrix that has a non-zero determinant which is sufficient to train a neural network NN of size N×M. in this case −65,536×65,536.

Once the neural network NN has been trained, the system is ready to automatically generate new parameters of security controls based on a new configuration of the element of IS in the production environment.

Specifically, a new configuration of the element in the production environment is communicated to the system, for example, that configuration has K<=N ports P(1), P(2), . . . , P(K) open.

The M-embedding of the configuration of the element is a sequence of N ones or zeroes wherein all values are zeros except for the positions that have the open ports P(1), P(2), . . . , P(K).

That M-embedding is used as an input into the neural network NN that outputs an N-embedding that consists of the same sequence of ones and zeros.

That N-embedding is used to generate parameters of security controls where each zero is converted to a False value for the corresponding port for the vulnerability scanner and one is converted into a True value for the corresponding port indicating if a given port is expected to contain a listening software.

At the final step, the system applies the new parameters of security controls by re-configuring the security control for the element of IS in the production environment, in this example—the vulnerability scanner, corresponding to the new configuration of the element of IS to match the newly generated parameters of the security test scenario generated based on the N-embedding that was output by the neural network NN in response to the M-embedding of the new configuration of the element of IS.

FIG. 1 depicts the block-level diagram of the disclosed method 100 of automatic application of the set of security controls.

The method obtains historical information about different configurations that are marked safe of the element of the system IS under test and related parameters of security controls from the test management system TMS 102.

Each configuration of the element is represented as a finite set of individual settings represented by numeric values. If a setting has an undefined range, for example, it is a free-hand field, the range of available values is limited to a certain length. Non-numeric values of individual settings are represented by their numeric representation in computer memory. As such, each configuration is represented as an embedding—a numeric sequence of a finite length M representing the particular configuration, an M-embedding.

Each set of security controls is represented as a finite set of individual security control settings represented by numeric values. If a setting has an undefined range, for example, it is a free-hand field, the range of available values is limited to a certain length. Non-numeric values of individual settings are represented by their numeric representation in computer memory. As such, each set of security controls is represented as an embedding—a numeric sequence of a finite length N representing the particular set of security controls, an N-embedding.

Step 104 calculates an M-embedding of another safe configuration of the element of IS and M-embedding of corresponding parameters of security controls.

At step 106, the system checks if the collected set of embedding pairs is sufficient to train the neural network NN configured to take M-embedding as an input and output an N-embedding. If a sufficient number of pairs of embeddings have been collected, the method passes the collection of pairs of embeddings to step 108 where these embeddings are used to train the neural network NN.

If the set of collected pairs of embeddings is insufficient to train the neural network NN, the method goes back to step 102 to collect another pair of settings of the element of IS marked as safe and corresponding parameters of security controls.

After the neural network on step 108 has been trained, the system is ready to produce new parameters of security controls in response to receiving information about new configuration of the element of IS.

At step 110, the method receives information about the new configuration of the element of IS in the production environment.

At step 112, the M-embedding of that new configuration of the element of IS in the production environment is calculated from the new configuration of the element of IS in the production environment.

At step 114, the neural network NN is used to generate an N-embedding of parameters of security controls from the M-embedding of the new configuration of the element of IS the production environment.

At step 116, the newly generated N-embedding of parameters of security controls is converted to the parameters of security controls that are applied to the element of IS in the production environment at 118.

Method exits at 120 after applying the new parameters of security controls.

Figure 2:
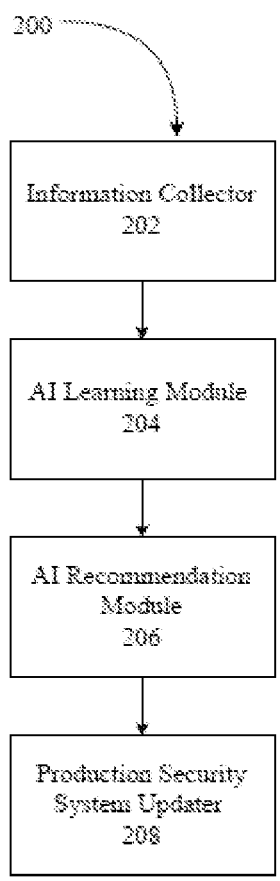
FIG. 2 is a block diagram of the system for automatic application of the set of security controls.

FIG. 2 depicts a block-level diagram of the system for automatic application of the set of security controls 200.

Information Collector 202 is configured to collect configurations marked as safe in the test management system TMS of the element of IS and corresponding parameters of security controls. 204.

The AI Learning Module 204 is configured to receive information from the Information Collector 202, to generate an M-embeddings of fixed length M of the configurations marked as safe of the element of IS and N-embeddings of fixed length N of the set parameters of security controls, and use these embeddings to train a neural network NN with input layer of size M and output layer of size N using the embeddings of collected information to prepare the neural network NN for use by the AI recommendation module 206.

AI recommendation module 206 is configured to obtain information about a new configuration of the element of IS in the production environment, to generate an M-embedding of the new configuration of the element of IS in the production environment, to calculate the N-embedding of the new set of security controls by inputting M-embedding of new configuration of the element of IS in the production environment into NN, to generate new parameters of security controls corresponding to the embedding output by NN, and to pass the newly generated parameters of security controls to the production security system updater 208.

The security production security system updater 208 is configured to receive the new parameters of security controls from the AI recommendation module and to apply these new parameters of security controls to the element of IS in the production environment.

The invention claimed is:

1. A method for automatically generating parameters of security controls in the production environment for an element of an information system (IS) using stored historical data about configurations of an element of the IS which have been marked safe in the test management system (TMS) and parameters of security test scenarios corresponding to these configurations, the method comprising the steps of:
 a. collecting information about the configurations of the element of IS marked as safe in the TMS and corresponding security controls resulting in the safe state of the element during the security testing;
 b. generating M-embeddings of the configurations of the element of IS of fixed length M and N-embedding of the parameters of security controls of fixed length N;
 c. training a neural network NN with input layer of size M and output layer of size N using the embeddings of collected information, wherein the AI is configured take as an input embedding EE of the configuration of the element of IS and to output an embedding of the set of security controls of fixed length N;
 d. obtaining information about a new configuration of the element of IS in the production environment;
 e. generating an M-embedding of the new configuration of the element of IS in the production environment;
 f. calculating an N-embedding of the parameters of security controls of fixed length N by inputting M-embedding of the new configuration of the element of IS in the production environment into NN;
 g. generating new parameters of security controls corresponding to the N-embedding output by NN; and
 h. setting the parameters of the set of security controls of the element of IS in the production environment to the values generated by the NN.

2. The method of claim 1, wherein the set of security controls comprises proxy server settings, vulnerability scanner settings, virus scanner settings, automatic updater settings, failed authentication settings, backup settings, keep-alive server settings, or logging settings.

3. The method of claim 1, wherein the element of IS comprises a communication device, a mobile device, a computer, physical server, a virtual machine, a web server, an FTP server, a file storage, a COTS application, a custom developed application, or a virtual environment.

4. The method of claim 1, wherein the configuration of element comprises the set of users, authentication policies, password strength policies, IP address, software version, a set of open ports, type and version of software listening on different ports, available CPU, available memory, total available disk space, amount of free disk space, backup schedule, list of installed software, or a list of other elements with which current element communicates.

5. The method of claim 1, wherein the information system IS comprises two elements E1 and E2 with the embeddings of size N1 and N2, embeddings of security controls of sizes M1 and M2, and neural network with an input layer the size of N1+N2 and output layer the size of M1+M2.

6. A system for automatically generating parameters of security controls in the production environment for an element of an information system (IS) using stored historical data about configurations of an element of the IS which have been marked safe in the test management system (TMS) and parameters of security controls corresponding to these configurations, comprising:
- a. an information collector configured to:
  - i. collect from TMS information about the combinations of configurations of the element of IS marked safe in TMS and corresponding parameters of security controls; and
  - ii. pass collected information to the AI learning module;
- b. an AI learning module configured to:
  - i. receive historical data from the information collector;
  - ii. generate an M-embeddings of configurations of the element of IS of fixed length M and an N-embeddings of the parameters of security controls of fixed length N; and
  - iii. train a neural network NN with input layer of size M and output layer of size N using the embeddings of collected information, wherein the neural network NN is configured take as an input M-embedding of the configuration of the element of IS and to output an N-embedding of the parameters of security controls;
- c. an AI recommendation module configured to:
  - i. obtain information about a new configuration of the element of IS in the production environment;
  - ii. generate an M-embedding of the new configuration of the element of IS in the production environment;
  - iii. calculate the N-embedding of the parameters of security controls by inputting the M-embedding of the new configuration of the elements of IS in the production environment into NN;
  - iv. generate a set of new parameters of security controls corresponding to the embedding output by NN; and
  - V. communicate the new parameters of security controls to the production security system updater module;
- d. a production security system updater module configured to:
  - i. obtain information about a new parameter of security controls from the AI recommendation module;
  - ii. apply the obtained new parameters of security controls to the element of IS in the production environment.

7. The system of claim 6, wherein the set of security controls comprises proxy server settings, vulnerability scanner settings, virus scanner settings, automatic updater settings, failed authentication settings, backup settings, keep-alive server settings, or logging settings.

8. The system of claim 6, wherein the element of IS comprises a communication device, a mobile device, a computer, physical server, a virtual machine, a web server, an FTP server, a file storage, a COTS application, a custom developed application, or a virtual environment.

9. The system of claim 6, wherein the configuration of element comprises the set of users, authentication policies, password strength policies, IP address, software version, a set of open ports, type and version of software listening on different ports, available CPU, available memory, total available disk space, amount of free disk space, backup schedule, a list of installed software, or a list of other elements with which current element communicates.

10. The system of claim 6, wherein the information system IS comprises two elements E1 and E2 with the embeddings of size N1 and N2, embeddings of security controls of sizes M1 and M2, and neural network with an input layer the size of N1+N2 and output layer the size of M1+M2.

* * * * *